United States Patent
Shibukawa et al.

(10) Patent No.: US 9,253,339 B2
(45) Date of Patent: Feb. 2, 2016

(54) IMAGE PROCESSING APPARATUS, CONTROL SYSTEM FOR IMAGE PROCESSING APPARATUS, AND RECORDING MEDIUM STORING A CONTROL PROGRAM FOR IMAGE PROCESSING APPARATUS

(71) Applicants: Tomoki Shibukawa, Kanagawa (JP); Tadashi Nagata, Kanagawa (JP); Hajime Kubota, Kanagawa (JP)

(72) Inventors: Tomoki Shibukawa, Kanagawa (JP); Tadashi Nagata, Kanagawa (JP); Hajime Kubota, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/165,850

(22) Filed: Jan. 28, 2014

(65) Prior Publication Data
US 2014/0226181 A1 Aug. 14, 2014

(30) Foreign Application Priority Data
Feb. 13, 2013 (JP) .................. 2013-025759

(51) Int. Cl.
*H04N 1/00* (2006.01)

(52) U.S. Cl.
CPC ....... *H04N 1/00127* (2013.01); *H04N 1/00167* (2013.01); *H04N 1/00188* (2013.01)

(58) Field of Classification Search
CPC .......... H04N 1/00129; H04N 1/00307; H04N 1/00408
USPC ................. 358/1.1–1.9, 1.11–1.18
See application file for complete search history.

(56) References Cited

U.S. PATENT DOCUMENTS

2010/0192206 A1* 7/2010 Aoyama ..................... 726/5
2011/0020027 A1 1/2011 Takubo et al.
2011/0314515 A1* 12/2011 Hernoud ............... H04W 12/06 726/2
2012/0198547 A1* 8/2012 Fredette .................... G06F 8/34 726/19

FOREIGN PATENT DOCUMENTS

| JP | 10-079819 | 3/1998 |
|---|---|---|
| JP | 2004-227136 | 8/2004 |
| JP | 2005-011090 | 1/2005 |
| JP | 2007-79941 | 3/2007 |
| JP | 2008-05286 | 1/2008 |
| JP | 2011-028317 | 2/2011 |
| JP | 2011-056957 | 3/2011 |
| JP | 2011-138392 | 7/2011 |
| JP | 2011-171960 | 9/2011 |

* cited by examiner

*Primary Examiner* — King Poon
*Assistant Examiner* — Ibrahim Siddo
(74) *Attorney, Agent, or Firm* — Cooper & Dunham LLP

(57) ABSTRACT

A control system for an image processing apparatus that uses an information processing device. The image processing apparatus includes an authentication processor that authenticates users with reference to user information that associates, for multiple users, information regarding the user with starting screen information used to start operating the image processing apparatus and a screen information transmitter that transfers screen information to the information processing device independent of the image processing apparatus. The screen information is used to display the starting screen on the image processing apparatus based on the starting screen information associated with the user authenticated by the authentication processor. The information processing device includes a screen information management unit that receives the screen information and a screen display processor that displays the starling screen on a display unit of the information processing device based on the received screen information.

5 Claims, 14 Drawing Sheets

| USER ID | HOME INFORMATION | PASSWORD | |
|---|---|---|---|
| 001 | home001.db | xxxxxxxxxx | |
| 002 | home002.db | xxxxxxxxxx | ... |
| 003 | home003.db | xxxxxxxxxx | |
| ... | | | |

FIG. 8

| DISPLAY LOCAITION | | | ICON | PROGRAM |
|---|---|---|---|---|
| NTH SCREEN | X | Y | | |
| 1 | 1 | 1 | MAIL.png | MAIL.apk |
| 1 | 1 | 2 | WORD_PROCESSOR.png | WORD_PROCESSOR.apk |
| 1 | 1 | 3 | CALENDAR.png | CALENDAR.apk |
| 1 | 1 | 4 | CALCULATOR.png | CALCULATOR.apk |
| 1 | 2 | 1 | WEATHER.wdgt | WEATHER.apk |
| 1 | 2 | 2 | WEATHER.wdgt | WEATHER.apk |
| 1 | 2 | 3 | DATE_TIME.wdgt | DATE_TIME.wdgt |
| 1 | 2 | 4 | DATE_TIME.wdgt | DATE_TIME.wdgt |
| 1 | 3 | 1 | WEATHER.wdgt | WEATHER.apk |
| 1 | 3 | 2 | WEATHER.wdgt | WEATHER.apk |
| 1 | 3 | 3 | DATE_TIME.wdgt | DATE_TIME.wdgt |
| 1 | 3 | 4 | DATE_TIME.wdgt | DATE_TIME.wdgt |
| 1 | 4 | 1 | NONE | NONE |
| 1 | 4 | 2 | NONE | NONE |
| 1 | 4 | 3 | NONE | NONE |
| 1 | 4 | 4 | BROWSER.png | BROWSER.apk |
| 2 | 1 | 1 | NONE | NONE |
| ... | | | | |
| 2 | 4 | 4 | NONE | NONE |
| 3 | 1 | 1 | NONE | NONE |
| ... | | | | |
| 2 | 4 | 4 | NONE | NONE |
| 3 | 1 | 1 | NONE | NONE |

FIG. 11

| DISPLAY LOCATION | | | ICON | PROGRAM |
|---|---|---|---|---|
| NTH SCREEN | X | Y | | |
| 1 | 1 | 1 | COPIER.png | COPIER.apk |
| 1 | 1 | 2 | SCANNER.png | SCANNER.apk |
| 1 | 1 | 3 | FAX.png | FAX.apk |
| 1 | 1 | 4 | PRINTER.png | PRINTER.apk |
| 1 | 2 | 1 | NONE | NONE |
| 1 | 2 | 2 | NONE | NONE |
| 1 | 2 | 3 | NONE | NONE |
| 1 | 2 | 4 | NONE | NONE |
| 1 | 3 | 1 | NONE | NONE |
| 1 | 3 | 2 | NONE | NONE |
| 1 | 3 | 3 | NONE | NONE |
| 1 | 3 | 4 | NONE | NONE |
| 1 | 4 | 1 | NONE | NONE |
| 1 | 4 | 2 | NONE | NONE |
| 1 | 4 | 3 | NONE | NONE |
| 1 | 4 | 4 | BROWSER.png | BROWSER.apk |
| 2 | 1 | 1 | NONE | NONE |
| ... | | | | |
| 2 | 4 | 4 | NONE | NONE |
| 3 | 1 | 1 | NONE | NONE |
| ... | | | | |
| 2 | 4 | 4 | NONE | NONE |
| 3 | 1 | 1 | NONE | NONE |

FIG. 14

| DISPLAY LOCAITION | | | ICON | PROGRAM |
|---|---|---|---|---|
| NTH SCREEN | X | Y | | |
| 1 | 1 | 1 | COPIER.png | COPIER.obj |
| 1 | 1 | 2 | SCANNER.png | SCANNER.obj |
| 1 | 1 | 3 | FAX.png | FAX.obj |
| 1 | 1 | 4 | PRINTER.png | PRINTER.obj |
| 1 | 2 | 1 | NONE | NONE |
| 1 | 2 | 2 | NONE | NONE |
| 1 | 2 | 3 | NONE | NONE |
| 1 | 2 | 4 | NONE | NONE |
| 1 | 3 | 1 | NONE | NONE |
| 1 | 3 | 2 | NONE | NONE |
| 1 | 3 | 3 | NONE | NONE |
| 1 | 3 | 4 | NONE | NONE |
| 1 | 4 | 1 | NONE | NONE |
| 1 | 4 | 2 | NONE | NONE |
| 1 | 4 | 3 | NONE | NONE |
| 1 | 4 | 4 | BROWSER.png | BROWSER.obj |
| 2 | 1 | 1 | NONE | NONE |
| . . . | | | | |
| 2 | 4 | 4 | NONE | NONE |
| 3 | 1 | 1 | NONE | NONE |
| . . . | | | | |
| 2 | 4 | 4 | NONE | NONE |
| 3 | 1 | 1 | NONE | NONE |

| DISPLAY LOCATION | | | ICON | PROGRAM | DISPLAY LOCATION | | | ICON | PROGRAM |
| --- | --- | --- | --- | --- | --- | --- | --- | --- | --- |
| NTH SCREEN | X | Y | | | NTH SCREEN | X | Y | | |
| 1 | 1 | 1 | COPIER.png | COPIER.apk | 1 | 1 | 1 | COPIER.png | COPIER.obj |
| 1 | 1 | 2 | SCANNER.png | SCANNER.apk | 1 | 1 | 2 | SCANNER.png | SCANNER.obj |
| 1 | 1 | 3 | FAX.png | FAX.apk | 1 | 1 | 3 | FAX.png | FAX.obj |
| 1 | 1 | 4 | PRINTER.png | PRINTER.apk | 1 | 1 | 4 | PRINTER.png | PRINTER.obj |

IMAGE PROCESSING APPARATUS, CONTROL SYSTEM FOR IMAGE PROCESSING APPARATUS, AND RECORDING MEDIUM STORING A CONTROL PROGRAM FOR IMAGE PROCESSING APPARATUS

CROSS-REFERENCE TO RELATED APPLICATION

This patent application is based on and claims priority pursuant to 35 U.S.C. §119 to Japanese Patent Application No. 2013-025759, filed on Feb. 13, 2013 in the Japan Patent Office, the entire disclosure of which is hereby incorporated by reference herein.

BACKGROUND

1. Technical Field

The present invention relates to an image processing apparatus, a control system for an image processing apparatus, a system including an image processing apparatus and an information processing device, and recording medium storing a control program for the image processing apparatus.

2. Background Art

With increased computerization of information, image processing apparatuses such as printers and facsimiles used for outputting the computerized information and scanners used for computerizing documents have become indispensable. In most cases, these image processing apparatuses are configured as multifunctional peripherals (MFPs) that can be used as a printer, facsimile, scanner, and copier by implementing an image pickup function, image forming function, and communication function, etc.

On the other hand, mobile phones have also become highly functionalized, and mobile information processing apparatuses such as smart phones and tablet devices that have information processing functions approaching the sophistication of PCs (hereinafter referred to as "mobile devices") have become popular. These mobile devices generally include a home screen as a starting point for user operations, with applications accessed via icons displayed on the home screen. Further, for added convenience it is now possible to configure the home screen in accordance with operation history and displays the home screen has been proposed (e.g., JP-2011-066850-A).

SUMMARY

An example embodiment of the present invention provides a control system for an image processing apparatus that uses an information processing device. The image processing apparatus includes an authentication processor that authenticates users with reference to user information that associates, for multiple users, information regarding the user with starting screen information used to start operating the image processing apparatus and a screen information transmitter that transfers screen information to the information processing device independent of the image processing apparatus. The screen information is used to display the starting screen on the image processing apparatus based on the starting screen information associated with the user authenticated by the authentication processor. The information processing device includes a screen information management unit that receives the screen information and a screen display processor that displays the starting screen on a display unit of the information processing device based on the received screen information.

An example embodiment of the present invention includes a non-transitory recording medium storing a program that causes the computer to implement a system controlling method.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 8 is a diagram illustrating configuration information of a home screen as an embodiment of the present invention.

FIG. 11 is a diagram illustrating information consisting of a home screen as an embodiment of the present invention.

FIG. 14 is a diagram illustrating home information as an embodiment of the present invention.

FIG. 15 is a diagram illustrating conversion information as an embodiment of the present invention.

DETAILED DESCRIPTION

Figure 1:
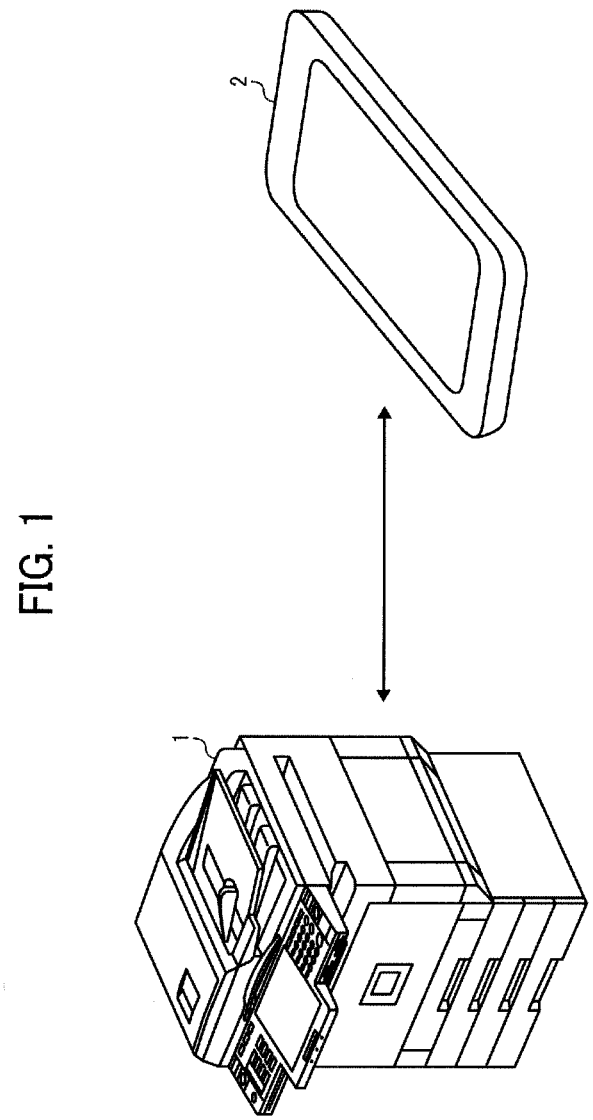
FIG. 1 is a diagram illustrating a system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Many of mobile devices described above include interfaces such as a touch panel, GPS, velocity sensor, and wireless communications capability, and can be used for various purposes depending on the software. Consequently, those mobile devices can be used as a display panel to operate the image processing apparatuses described above.

Here, taking a network printer located at an office, etc., and shared by multiple users as an example, it is practiced to authenticate login of each user and configure a control screen customized for each login user in an image processing apparatus. Consequently, if the mobile device described above is used as a control panel for the image processing apparatus, it is required to display a home screen in accordance with a user who logins the apparatus.

However, since the general mobile device is designed on the premise of personal use, sometimes it is difficult to change multiple different home screens depending on specification of an operating system (OS) that controls the mobile device and middleware.

Consequently, in case of mounting the dedicated mobile device to be used as the control panel for the image processing apparatus, sometimes it is difficult to display a home screen in accordance with a user who logins the image processing apparatus. In addition, in case of utilizing the mobile device that each user uses personally, sometimes it is difficult to change from a home screen of the mobile device in usual use to a home screen when the mobile device is used as the control panel of the image processing apparatus.

It should be noted that this kind of issue can occur not only in case of using the mobile device as the control panel of the image processing apparatus but also in case of using a device controlled by an operating system independent from the main unit of the image processing apparatus as the control panel for the image processing apparatus similarly. That is, in case of wired connecting the device controlled by an operating system independent from the main unit of the image processing apparatus with the main unit of the image processing apparatus so that the device is used not as a general-purpose mobile information processing device but only as the control panel of the image processing apparatus, that can be an issue too.

In view of the above, in the following embodiment, an image processing apparatus system and recording medium storing a control program of an image processing apparatus that makes it easy to change a screen as a starting point of operation in case of using a device controlled independently from the main unit of the image processing apparatus is provided.

In the following embodiment, a system in which the image processing apparatus is operated via the mobile device such as a smart phone and tablet device is taken as an example.

FIG. 1 is a diagram illustrating an image processing system in this embodiment. As shown in FIG. 1, in a control system for the image processing apparatus in this embodiment, an image processing apparatus 1 and a mobile device 2 are communicably connected with each other.

The image processing apparatus 1 is a MFP that implements an image pickup function, image forming function, and communication function and can be used as a printer, facsimile, scanner, and copier. The mobile device 2 is a portable information processing device such as a smart phone, tablet device, and Personal Digital Assistant (PDA). In this embodiment, the mobile device 2 is an information processing device controlled independently from the main unit of the image processing apparatus 1 and functions as a control panel to control the image processing apparatus 1 by installing application programs provided by a manufacturer of the image processing apparatus and a third party.

Figure 2:
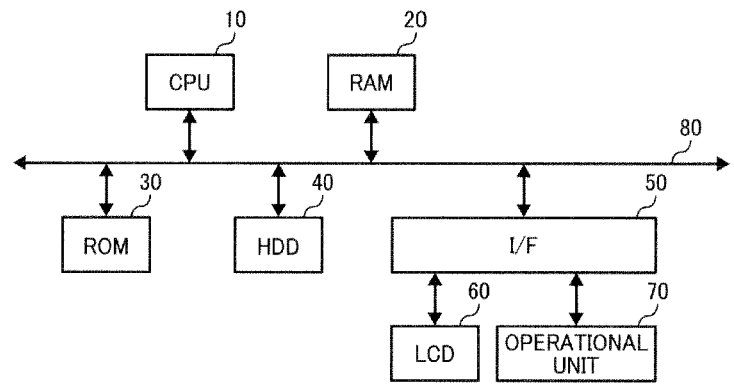
FIG. 2 is a block diagram illustrating a hardware configuration of an image processing apparatus as an embodiment of the present invention.

Next, hardware consisting of the information processing apparatus such as the image processing apparatus 1 and the mobile device 2 included in the image processing system of this embodiment is described below. FIG. 2 is a block diagram illustrating a hardware configuration of the image processing apparatus. As shown in FIG. 2, the information processing apparatus in this embodiment includes the same configuration as a general server or PC etc.

That is, in the information processing apparatus in this embodiment, a Central Processing Unit (CPU) 10, a Random Access Memory (RAM) 20, a Read Only Memory (ROM) 30, a hard disk drive (HDD) 40, and an interface (I/F) 50 are connected with each other via a bus 80. In addition, a Liquid Crystal Display (LCD) 60 and an operational unit 70 are connected to the I/F 50. The image processing apparatus 1 includes an engine that executes forming an image, outputting the image, and scanning.

The CPU 10 is a processor and controls the whole operation of the information processing apparatus. The RAM 20 is a volatile storage device that can read/write information at high speed and is used as a work area when the CPU 10 processes information. The ROM 30 is a read-only nonvolatile storage device and stores programs such as firmware. The HDD 40 is a nonvolatile storage device that can read/write information and stores the OS, various control programs, and application programs etc. In addition to the HDD, semiconductor memory devices such as a Solid State Drive (SSD) can be used.

The I/F 50 connects the bus 80 with various hardware and network etc. and controls them. The LCD 60 is a visual user interface to check status of the information processing apparatus. The operational unit 70 is a user interface such as a keyboard, mouse, various hardware buttons, and touch panel to input information to the information processing apparatus. It should be noted that the mobile device 2 functions as the control panel of the image processing apparatus 1 in the system of this embodiment. Consequently, the user interfaces connected to the image processing apparatus 1 directly such as the LCD 60 and the operational unit 70 can be omitted.

In this hardware configuration described above, programs stored in storage devices such as the ROM 30, HDD 40, and optical discs (not shown in figures) are read to the RAM 20, and a software controlling unit is constructed by executing operation in accordance with the programs by the CPU 10. Functional blocks that implement functions of apparatuses that consist of the image processing system of this embodiment are constructed by a combination of the software controlling units described above and hardware.

Figure 3:
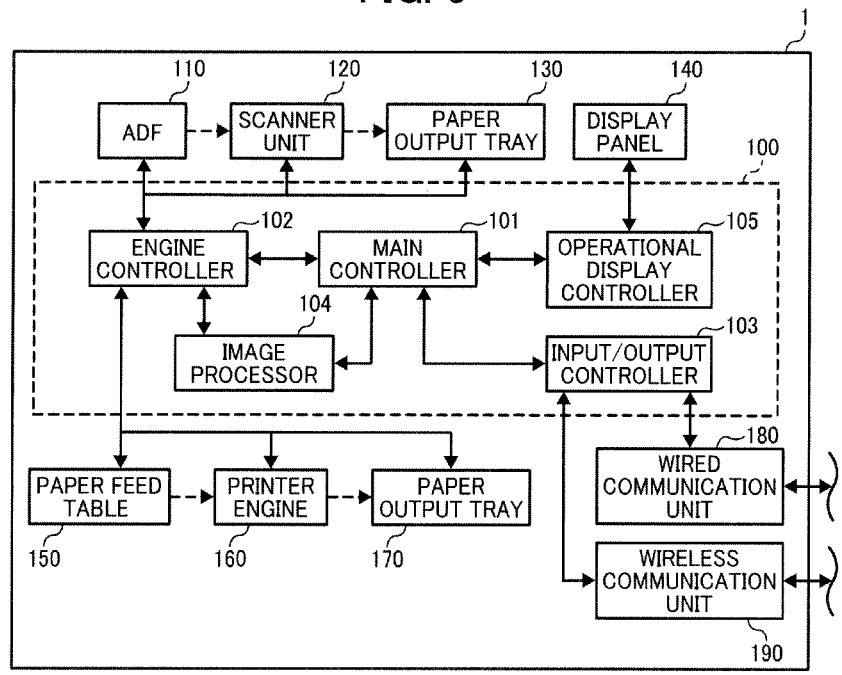
FIG. 3 is a block diagram illustrating a functional configuration of the image processing apparatus as an embodiment of the present invention.

Next, functions of the image processing apparatus 1 in this embodiment are described below. FIG. 3 is a block diagram illustrating a functional configuration of the image processing apparatus 1. As shown in FIG. 3, the image processing apparatus 1 includes a controller 100, an Auto Document Feeder (ADF) 110, a scanner unit 120, a paper output tray 130, a display panel 140, a paper feed table 150, a print engine 160, a paper output tray 170, a wired communication unit 180, and a wireless communication unit 190.

The controller 100 includes a main controller 101, an engine controller 102, an input/output controller 103, an image processor 104, and an operational display controller 105. As shown in FIG. 3, the image processing apparatus 1 in this embodiment is constructed as the MFP that includes the scanner unit 120 and the print engine 160. In FIG. 3, solid arrows indicate electrical connections, and dashed arrows indicate flow of paper.

The display panel 140 is both an output interface that displays status of the image processing apparatus 1 visually and an input interface (operational unit) to operate the image processing apparatus 1 directly or input information to the image processing apparatus 1. While the display panel 140 is realized by the LCD 60 and the operational unit 70 shown in FIG. 2, it is possible to configure only the mobile device 2 as the user interface of the image processing apparatus 1 and omit the display panel 140. In addition, instead of the mobile device 2 described above, an information processing device controlled by an OS independent from the main unit of the image processing apparatus 1 can be wired connected to the main unit of the image processing apparatus 1 fixedly to be used only as the input interface (operational unit) described above for the image processing apparatus 1.

The wired communication unit 180 is an interface that the image processing apparatus 1 communicates with other apparatuses by wired communication, and Ethernet and USB interface are used for the wired communication unit 180. The wireless communication unit 190 is an interface that the image processing apparatus 1 communicates with other apparatuses by wireless communication, and interfaces such as Wireless Fidelity (Wi-Fi) and FeliCa are used as the wireless communication unit 190. The image processing apparatus 1 exchanges information with the mobile device 2 using the wired communication unit 180 or the wireless communication unit 190. In case of the information processing device wired connected to the main unit of the image processing apparatus 1 instead of the mobile device 2, the information processing device exchanges information with the main unit of the image processing apparatus 1 using the wired communication unit 180 or the wireless communication unit 190.

The controller 100 combines software and hardware. In particular, control programs such as firmware stored in nonvolatile storage devices such as the ROM 30 and the HDD 40 are loaded into the RAM 20, and the software controlling unit is implemented by executing operations by the CPU 10 in accordance with the programs. The controller 100 is constructed of the software controlling unit and hardware such as integrated circuits. The controller 100 functions as a controller that controls the whole part of the image processing apparatus 1.

The main controller 101 controls each unit included in the controller 100 and commands each unit in the controller 100. The engine controller 102 controls and drives the print engine 160 and the scanner unit 120. The input/output controller 103 inputs signals and commands input via the wired communication unit 180 and the wireless communication unit 190 to the main controller 101. In addition, the main controller 101 controls the input/output controller 103 and accesses other apparatuses such as the mobile device 2 via the wired communication unit 180 and the wireless communication unit 190.

The image processor 104 generates drawing information based on image information to be printed and output under the control of the main controller 101. The drawing information is information that the print engine 160 as an image forming unit draws as an image to be formed in an image forming operation. The image processor 104 processes image pickup data input from the scanner unit 120 and generates image data. The generated image data is stored in the image processing apparatus 1 as a result of the scanner operation or transferred to another apparatus via the wired communication unit 180 and the wireless communication unit 190. The operational display controller 105 displays information on the display panel 140 and reports information input via the display panel to the main controller 101.

In the case of image processing apparatus that only has the printer function, the ADF 110, the scanner unit 120, and the paper output tray 130 shown in FIG. 3 are omitted, and functions to control the ADF 110, the scanner unit 120, and the paper output tray 130 are omitted from functions included in the engine controller 102.

If the image processing apparatus 1 functions as the printer, first, the input output controller 103 receives a print job via the wired communication unit 180 and the wireless communication unit 190. The received print job was generated by the information processing apparatus that requests the image processing apparatus 1 to execute printing. In addition, the print job includes header information to indicate that it is the print job, image information to be output, and parameter information to be configured to execute printing.

The input/output controller 103 transfers the received print job to the main controller 101. After receiving the print job, the main controller 101 generates the drawing information based on the document information and image information included in the print job by controlling the image generator 104. After the image generator 104 generates the drawing information, the engine controller 102 executes forming an image on paper carried from the paper feed table 150 based on the generated drawing information. As particular examples of the print engine 160, image forming mechanisms such as inkjet method and electrophotography method can be used. After the print engine 160 forms the image on the paper, the paper is ejected on the paper output tray 170.

If the image processing apparatus 1 functions as a scanner, in response to a command to execute scanning input by operation on the display panel 140 or from an external apparatus via the wired communication unit 180 and the wireless communication unit 190, the operational display controller 105 or the input/output controller 103 transfers a signal to execute scanning to the main controller 101. The main controller 101 controls the engine controller 102 based on the received signal to execute scanning. The engine controller 102 drives the ADF 110 and carries a document to be scanned set on the ADF 110 to the scanner unit 120. In addition, the engine controller 102 drives the scanner unit 120 and scans the document carried from the ADF 110. If the document is not set on the ADF 110 and the document is set on the scanner unit 120 directly, the scanner unit 120 scans the set document under the control of the engine controller 102. That is, the scanner unit 120 functions as the image pickup unit.

In scanning operation, an image pickup device such as CCD included in the scanner unit 120 scans the document optically, and image pickup information is generated based on the optical information. The engine controller 102 transfers the image pickup information generated by the scanner unit 120 to the image processor 104. The image processor 104 generates the image information based on the image pickup information received from the engine controller 102 under the control of the main controller 101. The image information generated by the image processor 104 is stored in the storage device such as the HDD 40 attached to the image processing apparatus 1. The image information generated by the image processor 104 is either stored in the HDD 40 etc. as is or transferred to an external apparatus by the input/output controller 103 via the wired communication unit 180 or the wireless communication unit 190 depending on the user command.

If the image processing apparatus 1 functions as a copier, the image processor 104 generates the drawing information based on either the image pickup information received from the scanner unit 120 by the engine controller 102 or the image information generated by the image processor 104. Similarly as the printer operation, the engine controller 102 drives the print engine 160 based on the drawing information.

In the configuration of the image processing apparatus 1 described above, the main controller 101 in this embodiment includes a function to use the mobile device 2 as the user interface. The function included in the main controller 101 to use the mobile device 2 as the user interface is described below with reference to FIG. 4.

Figures 4, 5:
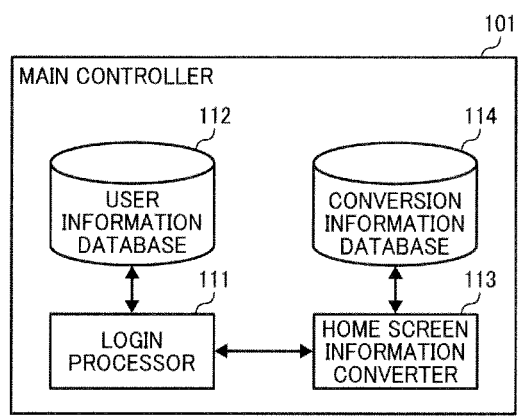
FIG. 4 is a block diagram illustrating a functional configuration of a controller in the image processing apparatus as an embodiment of the present invention.
FIG. 5 is a diagram illustrating information stored in a user information database as an embodiment of the present invention.

As shown in FIG. 4, the main controller 101 in this embodiment includes a login processor 111, a user information database 112, a home screen information converter 113, and a conversion information database 114 as functions to use the mobile device as the user interface. The login processor 111 refers to information stored in the user information database 112 and processes user login to the image processing apparatus 1. That is, the login processor 111 functions as an authentication processor that authenticates a user based on the input authentication information.

FIG. 5 is a diagram illustrating information stored in the user information database 112. As shown in FIG. 5, "user ID", "home information", and "password" are associated with each other and stored in the user information database 112 in this embodiment. "User ID" is identification information to identify users of the image processing apparatus, and "password" is authentication information to authenticate users identified by each user ID. This information is stored in the HDD 40 shown in FIG. 2 for example.

The control panel of the image processing apparatus 1 is configured to be customizable for each user, and the "home information" shown in FIG. 5 is an identifier to identify information on home screen customized for each user. The home screen information identified by the "home information" corresponds to a screen displayed on the display panel 140 shown in FIG. 3. That is, the user information database 112 stores user information associated with information on screen considered as a starting point in operation of the image processing apparatus 1. In addition, the "home information" registered as shown in FIG. 5 is used as the starting point screen information that indicates information on screen considered as a starting point in operation of the image processing apparatus 1.

The home screen information convertor 113 converts the information on home screen identified by the "home information" described above into information compatible with the mobile device 2 with reference to the conversion information database 114. That is, the home screen information converter 113 functions as an information convertor that converts information compatible with the display panel 140 into information compatible with the mobile device 2.

As described above, in the image processing apparatus 1 in this embodiment, the mobile device 2 is used as the user interface for the image processing apparatus 1. By converting information compatible with the display panel 140 into information compatible into the mobile device 2, it is possible to reflect the customization performed on the display panel 140 to a screen displayed on the mobile device 2. The information on the home screen and the information stored in the conversion information database 114 will be described in detail later.

Figure 6:
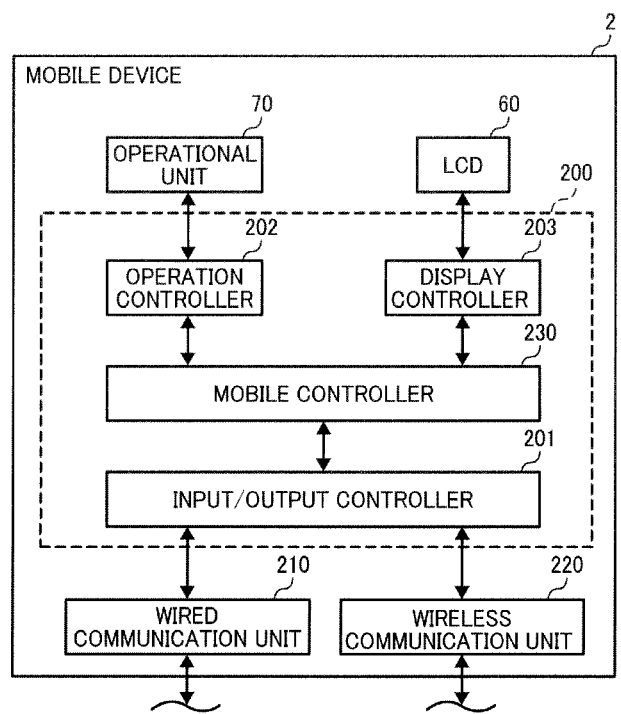
FIG. 6 is a block diagram illustrating a functional configuration of a mobile device as an embodiment of the present invention.

Next, a functional configuration of the mobile device 2 in this embodiment is described below with reference to FIG. 6. As shown in FIG. 6, the mobile device 2 in this embodiment includes a controller 200, a wired communication unit 210, and a wireless communication unit 220 in addition to the LCD 60 and the operational unit 70 shown in FIG. 2. The controller 200 includes an input/output controller 201, an operation controller 202, a display controller 203, and a mobile controller 230.

The wired communication unit 210 is an interface that the mobile device 2 communicates with other apparatuses via a network, and Ethernet and USB interface are used for the wired communication unit 210. The wireless communication unit 220 is an interface that the mobile device 2 communicates with other apparatuses by wireless communication, and interfaces such as Bluetooth, Wi-Fi, and FeliCa are used as the wireless communication unit 220. The wired communication unit 210 and the wireless communication unit 220 can be realized by the OF 50 shown in FIG. 2.

The controller 200 is constructed by a combination of software and hardware. The controller 200 controls the whole part of the mobile device 2. The input/output controller 201 acquires information input via the wired communication unit 210 and transfers information to other apparatuses via the wired communication unit 210. In addition, the input/output controller 201 acquires information input via the wireless communication unit 220 and transfers information to other apparatuses via the wireless communication unit 220.

The operation controller 202 acquires a signal of user operation on the operational unit 70 and input the signal to a module that operates on the mobile device 2 such as the mobile controller 230. The display controller 203 displays status of the mobile device 2 such as graphical user interface (GUI) of the mobile controller 230 on the LCD 60 as a display unit of the mobile device 2.

The mobile controller 230 controls the whole part of the mobile device 2 by commanding each unit by the controller 200. The mobile controller 230 is constructed of the OS, middleware, and various applications. A function to control displaying the home screen of the mobile device 2 among functions included in the mobile controller 230 is the key point in this embodiment.

Figure 7A:
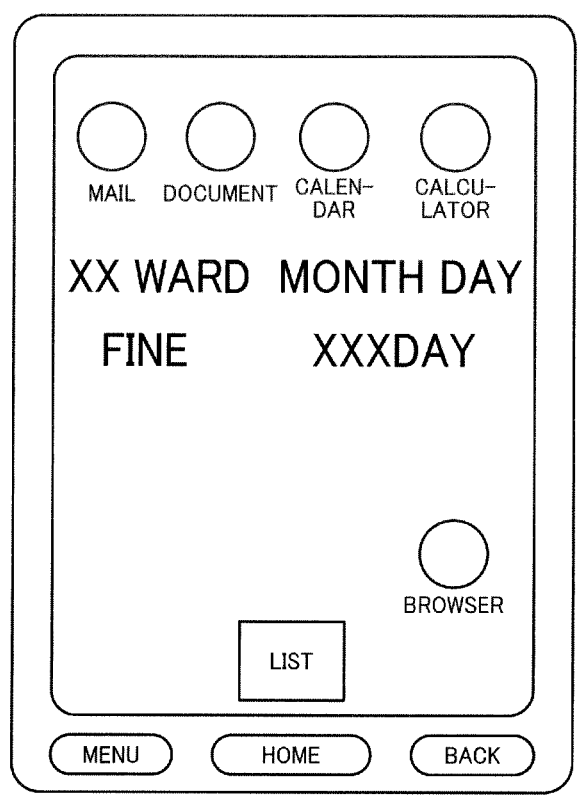
FIGS. 7A and 7B are diagrams illustrating an operational screen of the mobile device as an embodiment of the present invention.
Figure 7B:
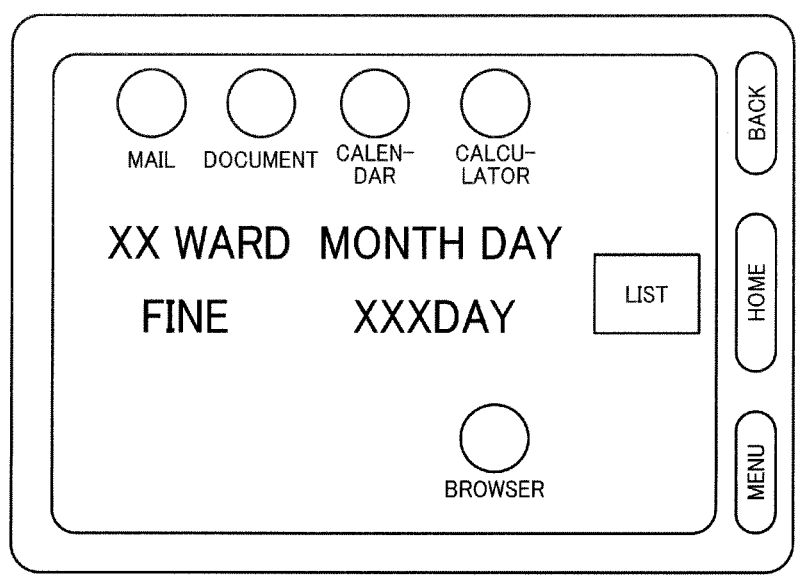

FIGS. 7A and 7B are diagrams illustrating home screens displayed on the LCD 60 of the mobile device 2 in this embodiment. FIGS. 7A and 7B illustrate screens that change depending on holding angle of the mobile device 2. As shown in FIGS. 7A and 7B, on the home screen of the mobile device 2 in this embodiment, icons to launch applications installed on the mobile device 2 such as "mail", "document", "calendar", "calculator", and "browser" are displayed. In addition, as displayed as "XX ward, fine" and "XXXday, month day", widgets to convey information to users are displayed on the home screen.

The home screen shown in FIGS. 7A and 7B is constructed based on information shown in FIG. 8. FIG. 8 is a diagram illustrating information of the home screen in this embodiment (hereinafter referred to as "home screen configuration information"). As shown in FIG. 8, display location on the home screen shown in FIGS. 7A and 7B is specified by information such as "screen location", "X", and "Y". Here, "screen location" specifies one of multiple home screens changeable by sliding operation, and "X" and "Y" indicate coordinate location on each screen.

In the home screen configuration information in this embodiment, for each specified "display location" as described above, information to identify "icon" to be displayed at the location and "program" launched in response to icon operation are associated. Among functions included in the mobile controller 230, a function to control display of the home screen controls the display controller 203 and instructs the display controller 203 to display the home screen on the LCD 60. Icon information such as "mail.png" and "word_processor.png" shown in FIG. 8 is stored in the nonvolatile storage device such as HDD in the mobile device 2. In addition, program information such as "mail.apk" and "word_processor.apk" is installed in the mobile device 2.

Figure 9:
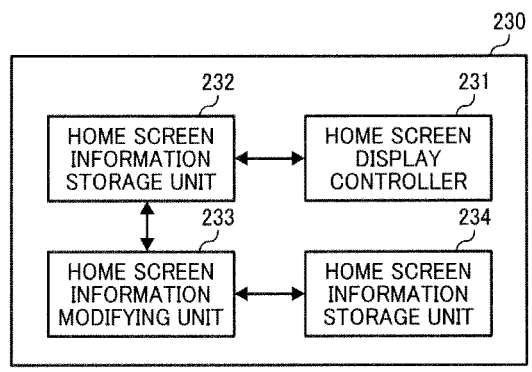
FIG. 9 is a diagram illustrating a functional configuration of a controller in the mobile device as an embodiment of the present invention.

Here, among functions included in the mobile controller 230, a function to display the home screen is described with reference to FIG. 9. As shown in FIG. 9, the mobile controller 230 in this embodiment includes a home screen display controller 231, a home screen information storage unit 232, a home screen information modifying unit 233, and a home screen storage unit 234 as units related to displaying the home screen.

The home screen display controller 231 is a screen display processor that generates information for displaying the home screens shown in FIGS. 7A and 7B based on the home screen configuration information shown in FIG. 8 and outputs the information to the display controller 203. The home screen information storage unit 232 stores the home screen configuration information shown in FIG. 8 so that the home screen display controller 231 can refer to the home screen configuration information. The home screen information storage unit 232 is a predetermined storage area in the RAM 20 or the HDD 40 shown in FIG. 2. That is, the home screen information storage unit 232 functions as a screen information storage unit.

The home screen display controller 231 of the mobile device 2 in this embodiment does not choose one home screen configuration information from multiple different home screen configuration information, generate information for displaying the home screen, and output the generated information. That is, the home screen display controller 231 refers to the home screen information storage unit 232 allocated as a storage area to store one home screen configuration information, generates the information for displaying the home screen based on the home screen configuration information stored in the home screen information storage unit 232, and outputs the generated information.

After acquiring the home screen configuration information newly input to the mobile controller 230, in order to display a different home screen on the LCD 60 based on the newly acquired home screen configuration information, the home screen information modifying unit 233 modifies the home screen configuration information stored in the home screen information storage unit 232 by overwriting the home screen configuration information. In that case, the home screen information modifying unit 233 in this embodiment copies the home screen configuration information stored in the home screen information storage unit 232 and stores the home screen configuration information in the home screen information storage unit 234. That is, the home screen information modifying unit 233 functions as a screen information management unit.

The home screen information storage unit 234 stores the home screen configuration information stored in the home screen information storage unit 232 when the home screen information modifying unit 233 modifies the home screen configuration information in the home screen information storage unit 232. The home screen information storage unit 234 is a predetermined storage area in the RAM 20 or the HDD 40 shown in FIG. 2 too as same as the home screen information storage unit 232.

Figure 10:
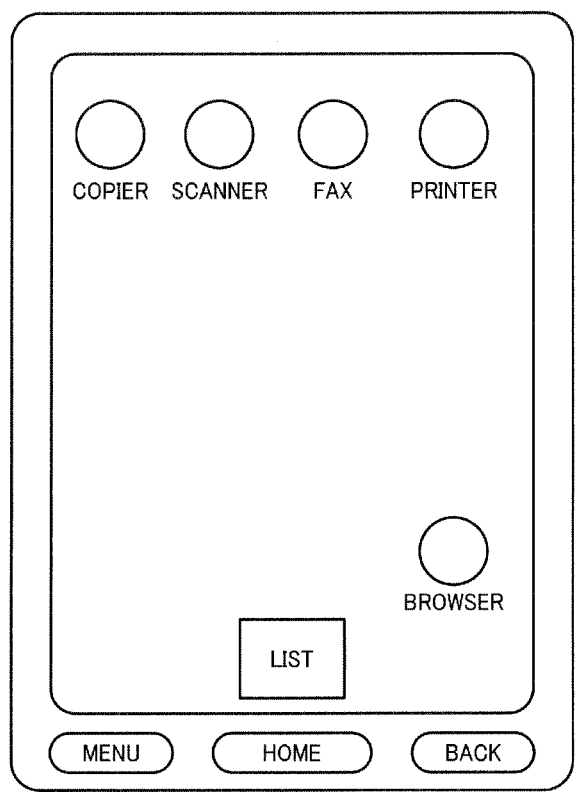
FIG. 10 is a diagram illustrating an operational screen of the mobile device as an embodiment of the present invention.

By taking the configuration described above, the mobile controller 230 in this embodiment can change the home screen displayed on the LCD 60 into different home screen. FIG. 10 is a diagram illustrating the home screen displayed on the mobile device 2 as the control panel of the image processing apparatus 1. As shown in FIG. 10, in case of being used as the home screen of the mobile device 2, icons for applications to control functions included in the image processing apparatus 1 such as "copy", "scanner", "fax", and "printer" are displayed.

FIG. 11 is a diagram illustrating the home screen configuration information to display the home screen shown in FIG. 10. In case of displaying the home screen shown in FIG. 10, as shown in FIG. 11, location of icons "copy", "scanner", "fax", and "printer" and program information is associated with information of "display location".

That is, if the home screen information modifying unit 233 acquires the home screen configuration information shown in FIG. 11 and overwrites the home screen configuration information stored in the home screen information storage unit 232 by using the acquired home screen configuration information, the home screen shown in FIGS. 7A and 7B is updated to the home screen shown in FIG. 11. Consequently, even in case of using the mobile device 2 as the control panel of the image processing apparatus 1, it is possible to display the home screen in accordance with the user who logins the image processing apparatus 1.

Figures 12, 13:
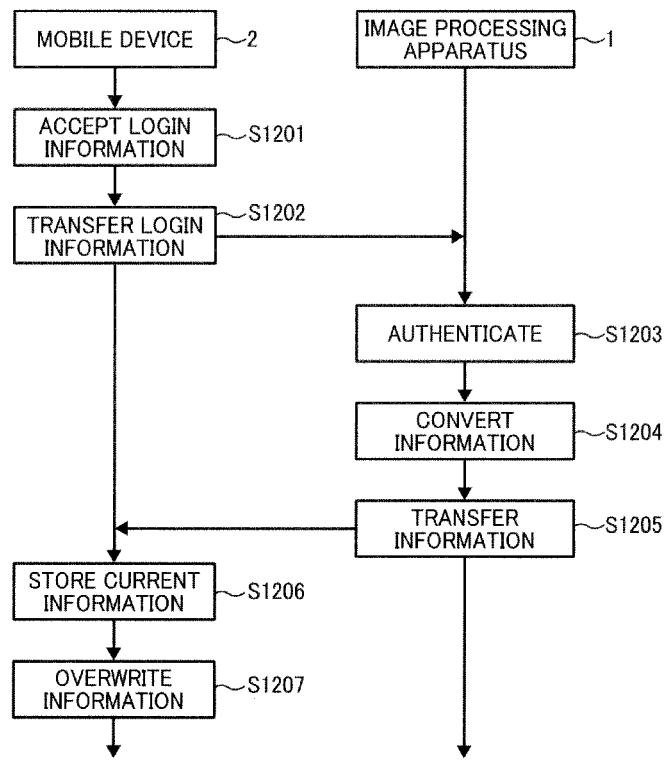
FIG. 12 is a sequence diagram illustrating operation of the system as an embodiment of the present invention.
FIG. 13 is a diagram illustrating a login screen as an embodiment of the present invention.

Next, operation when the home screen for each user is displayed in the system of this embodiment. FIG. 12 is a sequence diagram illustrating operation to display the home screen for each user in the system of this embodiment. In the operation shown in FIG. 12, it is assumed that connection between the mobile device 2 and the image processing apparatus 1 is established via the wired communication or the wireless communication. As shown in FIG. 12, first, the mobile controller 230 in the mobile device 2 accepts login information in S1201. FIG. 13 is a diagram illustrating a GUI to input login information.

The GUI shown in FIG. 13 is displayed on the mobile device 2 and configured as the GUI as the home screen information modifying unit 233. After acquiring the login information, the mobile device 2 transfers the acquired login information to the image processing apparatus 1 in S1202. The login information is transferred via the wired communication unit 210 and the wireless communication information unit 220 under the control of the input/output controller 201 in S1202.

The login information transferred to the image processing apparatus 1 is input to the login processor 111 in the main controller 101 via the input/output controller 103. After acquiring the login information transferred from the mobile device 2, the login processor 111 performs authentication with reference to the "user ID" and "password" registered in the user information shown in FIG. 5 in S1203.

After finishing the authentication, the login processor 111 acquires "home information" associated with the authenticated user ID in the user information database 112 shown in FIG. 5 and inputs the home information to the home screen information converter 113. In addition, the login processor 111 generates information for screen to be displayed on the display panel 140 and outputs the information to the operational display controller 105.

Here, as described above, the "home information" registered in the user information database 112 is information for screen displayed on the display panel 140 shown in FIG. 3. FIG. 14 is a diagram illustrating the home information registered in the user information database 112. As shown in FIG. 14, in the home information compatible with the display panel 140, format of "program" is different from the case in the mobile device 2, and information such as "copy.obj" and "scanner.obj" is specified.

FIG. 15 is a diagram illustrating conversion information stored in the conversion information database 114. After acquiring the home information from the login processor 111, the home screen information convertor 113 converts information compatible with the display panel 140 shown in FIG. 14 into information compatible with the mobile device 2 with reference to the conversion information shown in FIG. 15 in S1204. The converted information is used as screen information to display the home screen on the mobile device 2.

It should be noted that "display location" of information compatible with the display panel 140 shown in FIG. 14 corresponds to "display location" of information compatible with the mobile device 2 shown in FIG. 15. In other words, the information compatible with the display panel 140 is associated with the information compatible with the mobile device 2 considering the "display location" as the key. Alternatively, the information compatible with the display panel 140 can be associated with the information compatible with the mobile device 2 considering the information on "icon" as the key.

In FIG. 15, format of "display location" in information compatible with the display panel 140 corresponds to format of "display location" in information compatible with the mobile device 2. However, it is possible to configure the conversion information to convert different information formats.

After the home screen information converter 113 finishes converting the information with reference to the conversion information 114, the login processor 111 transfers the converted information to the home screen information modifying unit 233 in the mobile device 2 in S1205. Here, the login processor 111 functions as a screen information transmitter. The home screen configuration information shown in FIG. 11 is transferred in S1205. In addition, information on an icon image such as "copy.png" and "scanner.png" can be transferred too. In this case, it is unnecessary to store information on icon images in the mobile device 2.

After receiving the home screen configuration information from the image processing apparatus 1, as shown in FIG. 9, the home screen information modifying unit 233 reads the home screen configuration information stored in the home screen information storage unit 232 already and stores the read home screen configuration information in the home screen information storage unit 234 in S1206. Subsequently, the home screen information modifying unit 233 overwrites the home screen configuration information stored in the home screen information storage unit 232 by using the home screen configuration information received from the image processing apparatus 1 in S1207.

After finishing the step in S1207, the home screen display controller 231 generates display information for the home screen based on the overwritten home screen update information and outputs the display information to the display controller 203. Consequently, the home screen customized for the login user who utilizes the image processing apparatus 1 is displayed on the LCD 60 of the mobile device 2.

The home screen displayed on the LCD 60 of the mobile device 2 can be customized by user operation. When the home screen is customized by user operation, the home screen information modifying unit 233 updates the home screen configuration information stored in the home screen information storage unit 232 in accordance with the user operation.

Figure 16:
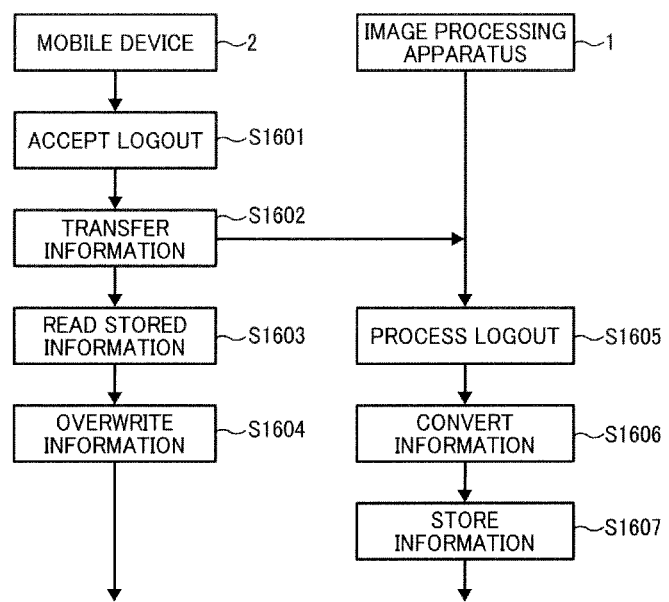
FIG. 16 is a sequence diagram illustrating operation of the system as an embodiment of the present invention.

Next, operation when the user who logins the image processing apparatus 1 and instructs to display the home screen as shown in FIG. 12 logouts is described below with reference to FIG. 16. As shown in FIG. 16, the mobile controller 230 accepts a request to logout in S1601. The home screen information modifying unit 233 reads the home screen configuration information stored in the home screen information storage unit 232 and transfers the home screen configuration information to the image processing apparatus 1 along with the notification to logout in S1602.

The home screen information modifying unit 233 reads the home screen configuration information stored in the home screen information storage unit 234 in S1603 and overwrites the home screen configuration information stored in the home screen information storage unit 232 in S1604. Consequently, the home screen displayed on the mobile device 2 returns to the state before the operation shown in FIG. 12 is performed.

On the other hand, in the image processing apparatus 1 that received the notification to logout and the home screen configuration information from the mobile device, the login processor 111 receives the information and performs logout process first in S1605. Subsequently, the login processor 111 converts the home screen configuration information received from the mobile device 2 into the information compatible with the display panel 140 in the image processing apparatus 1 with reference to the conversion information shown in FIG. 15 in S1606 and stores the information associated with the user who logged out in S1605 in the storage device such as the HDD 40 in S1607.

With the process described above, in case of being customized in the state of being displayed on the mobile device 2, the "home information" registered in the user information database 112 in the image processing apparatus 1 is updated reflecting the customization and stored. Consequently, if the same user logs in the image processing apparatus 1 and uses the mobile device 2 as the control panel next time, the home screen that reflects the customization performed in previous usage is displayed, and that can improve usability.

In S1601 in FIG. 16, the user performs the logout operation explicitly. Alternatively, the step in which logout is detected in S1601 can be substituted by detecting disconnection of a cable in case the mobile device 2 is wired connected to the image processing apparatus 1 or detecting disconnection in case the mobile device 2 is wireless connected to the image processing apparatus 1.

As described above, in the system of this embodiment, information of users who could use the image processing apparatus 1 are managed associated with the information on the home screen customized for each user. If a user logs in the apparatus, the information on the home screen associated with the user who logged in is transferred to the mobile device 2. In the mobile device 2, after receiving the information on the home screen from the image processing apparatus 1, the displayed home screen is changed by overwriting the information in the home screen information storage unit 232. Consequently, in case of using the mobile devices as the control panel of the image processing apparatus, the screen as the starting point of operation can be changed easily.

In case of overwriting the home screen configuration information stored in the home screen information storage unit 232, the home screen configuration information originally stored is stored in the home screen information storage unit 234 temporarily and written back in the home screen information storage unit 232 when the user logs out.

Consequently, in case the mobile device 2 is used as the control panel of the image processing apparatus 1 dedicatedly, the information on the common home screen before the user logs in is saved, and it is possible to change into the common home screen back after the user logs out. Alternatively, in case the mobile device 2 is owned by each user, the information on the normal home screen for each user is saved, and it is possible to change into the normal home screen back after logging out from the image processing apparatus 1.

In this embodiment described above, the information on the home screen compatible with the display panel 140 of the image processing apparatus 1 is registered in the user information database 112, and it is necessary to convert the information by the home screen information converter 113 in transferring the home screen configuration information to the mobile device 2. However, in this case, it is assumed that the display panel 140 exists. That is, it is possible to omit the display panel 140, and, in that case, it is possible to omit the home screen information converter 113 and the conversion information database 114 by registering the home screen configuration information compatible with the mobile device 2 in the user information database 112.

In addition, in this embodiment described above, as shown in FIG. 12, the login information is input via the GUI displayed on the mobile device 2 and transferred to the image processing apparatus 1. However, in case of attaching a non-contact card reader to the apparatus, it is possible to perform logging in by holding an IC card distributed for each user over the card reader. In this case, the steps in S1201 and S1202 in FIG. 12 can be omitted.

In this embodiment described above, in case of using the screen for inputting login information shown in FIG. 13, other than configuring the GUI as an application GUI, it is possible to configure the GUI as a widget displayed on the home screen. In that case, it is unnecessary to launch application to log in the image processing apparatus 1, and that can improve usability moreover.

In this embodiment described above, as shown in FIG. 4, the user information database 112 is managed in the image processing apparatus 1, and the login processor 111 in the main controller 101 manages the home screen configuration information. Alternatively, as shown in FIG. 17, it is possible to add a server 3 accessible from the image processing apparatus 1 and the mobile device 2 via a network, and the server 3 can perform login process and manage the home screen configuration information.

Figure 17:
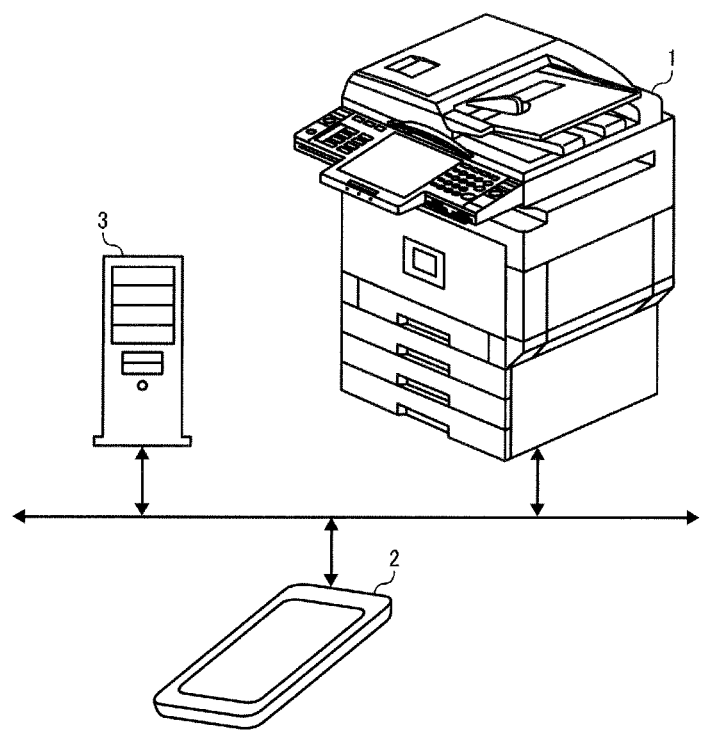
FIG. 17 is a diagram illustrating another system as an embodiment of the present invention.

In FIG. 17, the operation shown in FIG. 12 is performed between the mobile device 2 and the server 3. That is, the steps from S1203 to S1205 in FIG. 12 are executed on the server 3. Even in this case, it is assumed that the connection between the mobile device 2 and the image processing apparatus 1 is established. Consequently, it is possible to display the common home screen for each user on the multiple image processing apparatuses.

In this embodiment described above, the mobile device 2 is used as the control panel of the image processing apparatus 1. Alternatively, it is possible to wired connect an information processing device controlled by OS independent from the main unit of the image processing apparatus 1 to the main unit of the image processing apparatus 1 fixedly so that the information processing device functions as the control panel of the main unit of the image processing apparatus 1 dedicatedly.

The present invention be a method, performed by a control system for an image processing apparatus that uses an information processing device. The method of controlling the system comprising the steps of authenticating users with reference to user information associating multiple user information with starting screen information used to start operating the image processing apparatus, transferring screen information to display the starting screen on the image processing apparatus based on the starting screen information associated with the user information authenticated by the authentication processor, receiving the screen information, and displaying the starting screen on a display unit of the information processing device based on the received screen information.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

What is claimed is:

1. A control system for an image processing apparatus that uses an information processing device,
   the image processing apparatus including:
      a scanner unit that upon receiving a scan instruction, performs an image pickup of a hardcopy document and forms a document image of the hardcopy document;
      a printer engine that upon receiving a print instruction and drawing data, forms an image on a recording medium based on the drawing data;
      an operational unit including a display panel to input operational commands;
      an authentication processor to authenticate users with reference to user information, the user information associating, for each user amongst multiple users, information regarding the user with starting screen information used to start operating the image processing apparatus via the display panel of the image processing apparatus;
      an information converter to convert, based on information maintained in a conversion information database, the starting screen information for display of a starting display on the display panel of the image processing apparatus into converted screen information to display the starting screen on a display unit of the information processing device; and
      a screen information transmitter to transfer the converted screen information to the information processing device independent of the image processing apparatus,
      wherein the user information associates, for the multiple user, the information regarding the user with the starting screen information for display of the starting display on the operational unit of the image processing apparatus, the information converter converts the starting screen information associated with the user authenticated by the authentication processor into the converted screen information to display the starting screen on the display unit of the information processing device, and the screen information transmitter transfers the converted screen information to the information processing device; and
   the information processing device including:
      a screen information management unit to receive the converted screen information from the image processing apparatus; and
      a screen display processor to display the starting screen on the display unit of the information processing device based on the received screen information, wherein the image processing apparatus receives login information from the information processing device, and the image processing apparatus performs user authentication based on the login information received from the information processing device, and wherein the starting screen is displayed on the display unit of the information processing device based on the converted screen information transferred to the information processing device, to permit a device user of the information processing device, upon authentication of the device user, to control functions included in the image processing apparatus, the functions including any of a scan function and a print function.

2. The control system for an image processing apparatus according to claim 1, wherein the image processing apparatus further includes:

a screen information storage unit to store the screen information, wherein the screen information management unit of the information processing device overwrites information stored in the screen information storage unit with the received screen information, and the screen display processor instructs the display unit of the image processing device to display the starting screen based on the overwritten screen information.

3. The control system for an image processing apparatus according to claim 2, wherein the screen information management unit of the information processing device is configured to:

store the screen information already stored in the screen information storage unit in a different storage area in case of receiving new screen information; and overwrite information stored in the screen information storage unit with the screen information stored in the different storage area in case of detecting that the authenticated user finishes using the image processing apparatus.

4. An image processing apparatus communicably connectible to an information processing device, the image processing apparatus comprising:

a scanner unit that upon receiving a scan instruction, performs an image pickup of a hardcopy document and forms a document image of the hardcopy document;

a printer engine that upon receiving a print instruction and drawing data, forms an image on a recording medium based on the drawing data;

an operational unit including a display panel to input operational commands;

an authentication processor to authenticate users with reference to user information, the user information associating, for each user amongst multiple users, information regarding the user with starting screen information used to start operating the image processing apparatus;

an information converter to convert, based on information maintained in a conversion information database, the starting screen information for display of a starting display on the display panel of the image processing apparatus into converted screen information to display a starting screen on a display unit of the information processing device; and a screen information transmitter to transfer the converted screen information to an information processing device independent of the image processing apparatus, wherein the user information associates, for the multiple user, the information regarding the user with the starting screen information for display of the starting display on the display panel of the image processing apparatus, the information converter converts the starting screen information associated with the user authenticated by the authentication processor into the converted screen information to display the starting screen on the display unit of the information processing device, and the screen information transmitter transfers the converted screen information to the information processing device, wherein the image processing apparatus receives login information from the information processing device, and the image processing apparatus performs user authentication based on the login information received from the information processing device, and wherein the starting screen is displayed on the display unit of the information processing device based on the converted screen information transferred to the information processing device, to permit a device user of the information processing device, upon authentication of the device user, to control functions included in the image processing apparatus, the functions including any of a scan function and a print function.

5. A non-transitory, computer-readable recording medium storing a program that, when executed by a processor of an information processing device, cause the information processing device to perform a method for controlling an image processing apparatus that includes a scanner unit that upon receiving a scan instruction, performs an image pickup of a hardcopy document and forms a document image of the hardcopy document, a printer engine that upon receiving a print instruction and drawing data, forms an image on a recording medium based on the drawing data, and an operational unit including a display panel to input operational commands, the method comprising the steps of:

authenticating users with reference to user information, the user information associating, for each user amongst multiple users, information regarding the user with starting screen information used to start operating the image processing apparatus;

converting, based on information maintained in a conversion information database, starting screen information for display of a starting display on the display panel of the image processing apparatus into converted screen information to display a starting screen on a display unit of the information processing device; and transferring, from the image processing apparatus, to the information processing device independent of the image processing apparatus, the converted screen information, wherein the image processing apparatus receives login information from the information processing device, and the image processing apparatus performs user authentication based on the login information received from the information processing device, and wherein the starting screen is displayed on the display unit of the information processing device based on the converted screen information transferred to the information processing device, to permit a device user of the information processing device, upon authentication of the device user, to control functions included in the image processing apparatus, the functions including any of a scan function and a print function.

* * * * *